Figure 1:
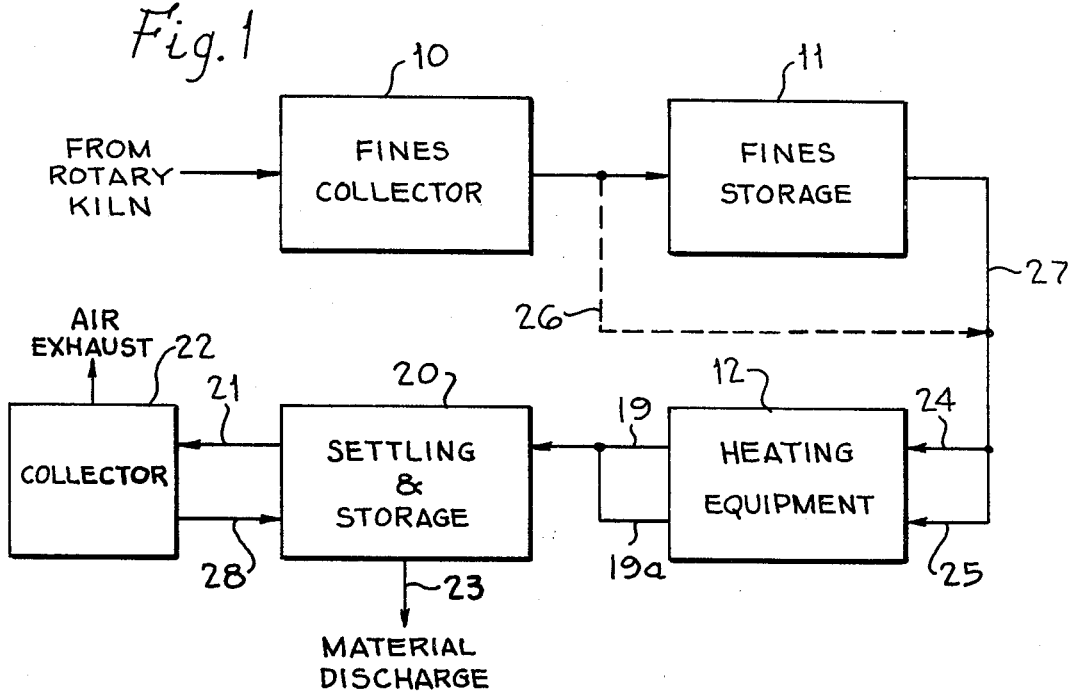

United States Patent [19]

Commins

[11] 3,878,288

[45] Apr. 15, 1975

[54] RECLAIMING OF LIME PLANT FINES

[76] Inventor: James A. Commins, 7708 Orchard Way, Philadelphia, Pa. 19118

[22] Filed: Feb. 15, 1972

[21] Appl. No.: 226,504

[52] U.S. Cl. ............... 423/175; 423/177; 423/637
[51] Int. Cl. .......................................... C01f 11/06
[58] Field of Search .......... 263/28, 32, 53; 423/175, 423/177, 637

[56] References Cited
UNITED STATES PATENTS

| | | | |
|---|---|---|---|
| 1,687,563 | 10/1928 | Honigmann et al. ............. | 263/28 X |
| 1,741,209 | 12/1929 | Swindell et al. ...................... | 263/28 |
| 1,824,351 | 9/1931 | Hunt ................................... | 423/177 |
| 2,687,290 | 8/1954 | Garoutte et al................... | 263/53 R |
| 3,050,298 | 8/1962 | Hall .................................... | 423/177 |
| 3,114,648 | 12/1963 | Rea.................................... | 263/53 X |
| 3,430,308 | 3/1969 | VanAlsburg.......................... | 263/28 |
| 3,638,400 | 2/1972 | Heilmann.......................... | 263/53 R |

Primary Examiner—O. R. Vertiz
Assistant Examiner—Brian E. Hearn
Attorney, Agent, or Firm—Weiser, Stapler & Spivak

[57] ABSTRACT

The fines collected by air pollution control equipment in lime processing plants, which are only partially calcined and therefore of insufficient economic value, are subjected to further calcining in a heated zone through which they are conveyed with short dwell time and without exposure to direct flame or forced air flow.

3 Claims, 1 Drawing Figure

RECLAIMING OF LIME PLANT FINES

This invention relates to improvements in the utilization of limestone, and particularly to the resolution of certain problems of such utilization which became acute by virtue of the imposition of stringent air pollution control requirements.

Heretofore, the typical limestone processing plant functioned as follows. First it obtained the raw, mined limestone to be processed, which consists primarily of calcium carbonate, with varying admixtures of magnesium carbonate, plus assorted impurities.

This raw limestone was then subjected to the appropriate crushing and sorting operations to bring it to the desired uniform size, which could range from about ⅜ to about 1 ½ inches.

Next, this crushed stone was calcined in a kiln, in which it was subjected to an intense, hot air blast created, for example, by the combustion of a stream of pulverized coal. Calcination converts the mineral carbonates into oxides, in the process driving off carbon monoxide which joins the gas stream flowing out of the kiln, while also becoming converted to a large extent into harmless carbon dioxide.

Finally, some of this calcined stone was further ground into powder and mixed with water to form slaked lime.

Depending primarily on the design of the kiln, varying proportions of the limestone fed into the kiln are blown off as fine, gas-borne dust particles. In the case of rotary kilns, these fine dust particles can constitute as much as 10 percent of the total weight of limestone processed.

Before air pollution controls were instituted, these fines presented no particular problem other than that of raw material wastage, because they were simply allowed to escape from the kiln and to be borne away into the atmosphere.

Air pollution controls now being imposed prohibit this and make it mandatory that these fines be collected, as they issue from the kiln. This creates a severe disposal problem. A lime plant of 600 tons-per-day capacity will have a catch of these fines amounting to about 120 tons per day. The physical magnitude of this catch will be appreciated when it is realized that it gives rise, over the course of a single year, to an accumulation of this material to a height of 10 feet, and covering an area of three acres.

To make matters worse, this catch is of no known economic value, as its carbonate content is still very high, and it therefore lacks the properties wanted in processed lime.

Finally, if collected and accumulated in dry form this catch again is subject to dispersal by wind, thereby creating a new, localized air pollution problem. If, alternatively, it is collected and accumulated in wet form, then its high alkalinity tends to pollute surrounding water bodies, or water-bearing strata.

It is, accordingly, a primary object of the invention to lessen the catch disposal problem noted above.

It is another object to lessen the storage problem for that catch.

It is still another object to lessen the pollution problems arising from the catch.

It is yet another object to prevent this catch from becoming an economic burden.

These, and other objects which will appear, are achieved, in accordance with my invention, by supplying the catch to a conveyor, passing it by means of that conveyor through a heating zone, and subjecting it to calcining temperatures in that heating zone for a period and under circumstances conducive to its calcination. In this manner, the catch, which previously constituted an economic burden, is converted into an economic asset, since the calcined fines so obtained are equivalent to the ground calcined material previously mentioned, and have equivalent market value.

Figure 2:
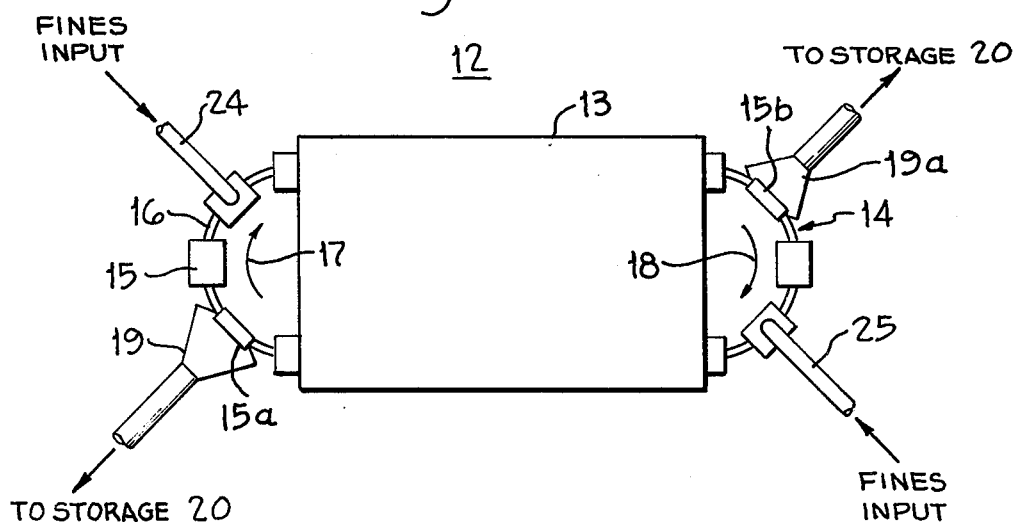

For further details, reference is made to the discussion which follows, in the light of the accompanying drawings, wherein FIG. 1 illustrates the flow of material in accordance with the invention; and FIG. 2 illustrates a preferred form of conveying and heating arrangement in accordance with the invention.

Referring now to FIG. 1, the system there illustrated in block diagram form, with arrows to show the directions of material flow, includes a fines collector 10. This may consist of a conventional filter, such as a baghouse, which is commonly employed to receive the gaseous and particulate effluents from rotary lime kilns (after coarse particles have been removed by a so-called primary collector) and to trap and collect the fines contained in these effluents, while permitting the gases to pass through. From the collector 10, these fines are then taken to a storage facility 11, where they are temporarily accumulated until they can be used further in accordance with the invention. From storage facility 11, these fines are gradually withdrawn and conveyed to heating equipment 12.

Certain details of this heating equipment are shown in plan view in FIG. 2, to which reference may now be had. It includes a heating zone formed by a hollow elongated chamber 13 within which a high temperature is developed. A closed loop conveyor 14 is provided, which passes lengthwise through the heating chamber 13, and whose ends extend beyond that chamber at opposite extremities thereof. The conveyor 14 may be of the so-called tilt-tray variety which is characterized by having a series of generally flat, normally horizontal trays (designated by reference numeral 15 in FIG. 2) strung out along the conveyor path. The path of the conveyor 14 is represented in FIG. 2 by track 16, and its direction of movement by arrows 17 and 18. The individual tilt trays are caused to move along the conveyor path in any conventional manner, as by a chain drive (not shown) common to all the trays.

At predetermined locations along the conveyor path, means are provided for tilting the normally horizontal trays 15, so as to discharge whatever material is carried thereon. Two such discharge locations are indicated in FIG. 2, tilted trays 15a and 15b. For reasons which will be explained later, these discharge locations are preferably so located that discharge takes place shortly after a tray has completed a one-way passage through heating chamber 13.

The mechanism which produces discharge by the tilting of trays 15 may take any of a variety of conventional forms. For example, a simple cam arrangement (not shown) positioned along the path of the tilt trays may be employed, which causes one side of the tray to lift relative to the other side as the tray passes the cam, thereby producing the desired tilting and resulting discharge.

Collection chutes 19, and 19a, respectively, are placed at the discharge locations in such relation to the conveyor 14 that material being discharged from each tilted tray falls into the adjacent chute, from where it is then further removed to a settling and storage chamber 20 (see FIG. 1.)

The storage chamber 20 has a gas outlet 21, leading to a dust collector 22, and a solid material outlet 23. A return path 28 from the collector 22 back to chamber 20 is also provided for solid material which may be trapped and collected in collector 22.

The passage of material from chutes 19 and 19a (FIG. 2) to storage chamber 20 may be caused to take place in any desired manner, as by the influence of gravity. Likewise the return of solids from collector 22 may take place under the influence of gravity. To that end, collector 22 may take the form of a conventional baghouse stationed directly above storage chamber 20, so that, when the bags are cycled to remove the solid materials trapped by them, these materials are automatically returned to the storage chamber 20.

Referring again to FIG. 2, there are also provided means for supplying material to the tilt trays 15 of conveyor 14. This may be accomplished by means of two supply pipes 24 and 25, having discharge ends respectively stationed above conveyor locations following those at which discharge into chutes 19 and 19a takes place.

As a tilt tray 15, now again in its normal, generally horizontal position, passes below such a supply pipe, material is discharged onto the tray from the pipe. The material so discharged onto the tilt trays consists of the fines collected by dust collector 10 (FIG. 1). These fines are supplied directly to the supply pipes 24, 25 via conduits 26, 27, the latter of which branches into the two separate supply pipes 24 and 25 (see FIG. 2).

A second path for the supply of such material to pipes 24 and 25 is from the collector 10 of FIG. 1, via storage chamber 11, again to conduit 27 and thence to the two branching supply pipes 24 and 25.

In heating chamber 13, the material on conveyor tilt trays 15 is subjected to heating by means which do not require a strong air blast. Thus, indirect heating can be utilized, in which burners (not shown) are positioned beneath the chamber, their heat then producing the desired elevated temperature within the chamber.

Alternatively, such burners may be placed within the chamber 13, but below the paths followed by the tilt trays through the chamber.

Other methods can also be used such as, for example, electric heating, or induction heating of the tilt trays themselves, if these are made of metal, or any other suitable method.

In any case, the temperature to which the material passing through the chamber 13 is exposed is so selected, in relation to the quantity of materials on the trays and the speed at which the material is carried through the heating chamber 13, that substantially complete calcination of that material takes place during its passage through the chamber.

The system described above with reference to FIGS. 1 and 2 functions as follows.

The incompletely calcined fines carried out from the rotary kiln of the lime plant by the air stream which issues from that kiln are trapped in fines collector 10. From there they are supplied to the tilt trays 15 of conveyor 14, which then cause them to pass through the chamber 13 in which they are exposed to further heating. This further heating completes their calcination, so that the material reaching storage chamber 20 is in the fully calcined state constituting a useful lime plant product.

The purpose of accomplishing the heating in chamber 13 in some manner which does not involve an air blast is to prevent such a blast from carrying the fines out of the heating chamber before they are fully calcined.

The use of flat tilt-trays makes it possible to subject to the heating effect in chamber 13 a comparatively thin layer of fines, so that heating of individual particles to achieve calcination is not needlessly retarded.

While no air blast is used for heating, evolution of gas takes place merely because of the chemical changes involved in calcination. This gas also entrains some of the fines, and it is to prevent these from being emitted to the atmosphere that collector 22 is employed. Also, the open ends of chamber 13, including the discharge means, are preferably hooded and collectively ducted, together with the calcined material, into storage chamber 20. This storage chamber is preferably so dimensioned that a considerable slowing of gases flowing through it toward collector 22 takes place, as a result of which some of the fines entrained in that gas tend to settle out within chamber 20, without even reaching collector 22.

It will be understood that the rate at which fines are supplied to conveyor 14 for subsequent processing is matched to the rate at which this material passes through, and becomes calcined in the chamber. Also, shut-off valves may be provided at the outlets of the supply pipes 24 and 25, actuated by arrival of a tilt tray below the pipe outlet to discharge the appropriate quantity of material onto that tray.

To accommodate variations in the rate of collection of fines from the kiln by collector 10, relative to the calcination of these fines in heating chamber 13, the fines storage 11 is provided. Fines are diverted to storage 11 whenever the quantity supplied from collector 10 to chamber 13 via conduit 26 becomes greater than chamber 13 can process. Conversely, fines are drawn from storage 11 and supplied to chamber 13, whenever the supply directly from collector 10 falls below the rate which chamber 13 can process.

This selection of supply source can be conveniently made either by human monitoring, or by automatic sensing of the accummulation of fines, or lack of same, in conduits 26 and 27.

It will be understood that, generally, control of the system can be performed by human attendants, or, alternatively, by process control equipment which is so well-known that no further description thereof is necessary here.

The parameters of heat in chamber 13, dwell time in the chamber, and the like, are predicated on the following.

Calcination of raw limestone proceeds in the stone on a zone or boundary basis of two solid phases—lime, and calcium carbonate. It has been shown that this process advances at a substantially constant linear rate, regardless of the particle size, depending only upon the character of the stone and the temperature. For example in one test of three different stones it was shown that at 1652°F the rate of calcination was 0.4 centimeters per hour (cm/hr) for high calcium limestone, 0.66 cm/hr for dolomitic limestone, and 1.0 cm/hr for dolomite. A typical limestone piece for calcining in a rotary kiln is on the order of 1.90 cm, so that this piece would require somewhere between 1.9 and 4.75 hours depending on the make-up of the stone. This time requirement for calcination of limestone pieces of this size is the reason for dwell times in rotary kilns of two to three hours. On the other hand, for a particle of high calcium fines having an effective diameter of 100 microns (0.01 cm), the calcination time at 1652°F would be only 1.5 minutes.

In practice, the heating chamber 13 is preferably so constructed that the temperature of the fines passing through it is raised to approximately 1600°F, at which temperature calcining will take place during a dwell time of approximately 1.5 minutes. The heating chamber 13 should be between 30 and 60 feet long, depending on the desired relationship between temperature and dwell time, and on the order of 20 feet wide, to accommodate comfortably the two traverses of the loop conveyor. Production capacity is increased by this utilization of the return path of the conveyor for a second pass through the heating chamber.

Many other variations will occur to those skilled in the art without departing from the inventive concept. Accordingly I desire that concept to be limited only by the appended claims.

I claim:

1. The process of treating the incompletely calcined limestone fines from a rotary kiln, comprising:
   introducing said fines into a heating zone;
   subjecting said fines in said zone to indirect heating, without an air blast capable of carrying said fines out of said zone, at a temperature of approximately 1600°F and for a period of approximately 1.5 minutes; and
   removing said fines from said zone after having been subjected to said heating.

2. The process of producing substantially completely calcined lime fines, comprising:
   passing limestone through a rotary kiln to form products including incompletely calcined lime fines;
   collecting said fines;
   introducing said fines into a heating zone separate from said kiln;
   subjecting said fines in said zone to indirect heating, without an air blast capable of carrying said fines out of said zone, at a temperature and for a period sufficient to complete their calcination; and
   removing the completed calcined fines from said zone.

3. The process of claim 2 wherein said heating is carried out at a temperature of approximately 1600°F for a period of approximately 1.5 minutes.

* * * * *